(12) United States Patent
Patil et al.

(10) Patent No.: US 12,152,469 B1
(45) Date of Patent: *Nov. 26, 2024

(54) REACTION OF METAL SALT WITH CARBON DIOXIDE FOR SUBTERRANEAN CARBON DIOXIDE MINERALIZATION

(71) Applicant: SAUDI ARABIAN OIL COMPANY, Dhahran (SA)

(72) Inventors: Pramod Dhanaji Patil, Dhahran (SA); Abdulaziz S. Qasim, Dhahran (SA); Ali A. Alyousef, Dhahran (SA); Zuhair A. Al-Yousef, Dhahran (SA); Muhammad M. Almajid, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,276

(22) Filed: Aug. 25, 2023

(51) Int. Cl.
*E21B 41/00* (2006.01)
*C09K 8/467* (2006.01)

(52) U.S. Cl.
CPC .......... *E21B 41/0064* (2013.01); *C09K 8/467* (2013.01)

(58) Field of Classification Search
CPC .............................. E21B 41/0064; C09K 8/467
See application file for complete search history.

(56) References Cited

U.S. PATENT DOCUMENTS

| | | |
|---|---|---|
| 8,899,331 B2 | 12/2014 | Burnham et al. |
| 8,952,127 B2 | 2/2015 | Chen et al. |
| 9,475,000 B2 | 10/2016 | Benyahia |
| 2008/0048514 A1 | 2/2008 | Hoffman et al. |

(Continued)

FOREIGN PATENT DOCUMENTS

CN 102491795 B 6/2012

OTHER PUBLICATIONS

Ziqiu Xue et al. Microbubble Carbon Dioxide Injection for Enhanced Dissolution in Geological Sequestration and Improved Oil Recovery. Dec. 2014Energy Procedia 63:7939-7946. DOI:10.1016/j.egypro.2014.11.828.

(Continued)

*Primary Examiner* — Silvana C Runyan
(74) *Attorney, Agent, or Firm* — Vorys, Sater, Seymour and Pease LLP

(57) ABSTRACT

Mineralizing carbon dioxide for storage may occur in a wellbore. For example, a method of mineralizing carbon dioxide may include: introducing, through a first wellbore to a subterranean formation, a first solution including a metal salt and a metal catalyst; introducing a second solution including a brine, wherein the second solution has nanobubble carbon dioxide at least partially dispersed therein, and wherein the second solution is introduced after introduction of the first solution; injecting carbon dioxide gas thereby at least partially dispersing the carbon dioxide gas in the first solution, thereby forming dissolved carbon dioxide; generating mineralized carbon dioxide from the dissolved carbon dioxide, wherein the generating includes catalytically reacting the metal salt and the dissolved carbon dioxide using the metal catalyst, thereby forming the mineralized carbon dioxide; and depositing the mineralized carbon dioxide within the subterranean formation.

19 Claims, 1 Drawing Sheet

(56) References Cited

U.S. PATENT DOCUMENTS

| | | | |
|---|---|---|---|
| 2011/0091366 A1* | 4/2011 | Kendall | C04B 14/04 |
| | | | 423/220 |
| 2012/0305346 A1 | 12/2012 | Wu | |
| 2013/0045514 A1 | 2/2013 | Barbero et al. | |
| 2016/0074806 A1* | 3/2016 | Benyahia | B01D 53/78 |
| | | | 423/220 |
| 2018/0280896 A1* | 10/2018 | Perkins | B01F 23/23765 |
| 2022/0381122 A1 | 12/2022 | Pope et al. | |
| 2023/0013989 A1 | 1/2023 | McPherson et al. | |
| 2023/0139894 A1 | 5/2023 | Brown | |

OTHER PUBLICATIONS

Bingbing Wang et al. Preparation and Properties of CO2 Micro-Nanobubble Water Based on Response Surface Methodology. Appl. Sci. 2021, 11(24), 11638; https://doi.org/10.3390/app112411638.

Xiaofeng Li, Bo Peng, Qi Liu, Jianwei Liu, Leiwang Shang, Micro and nanobubbles technologies as a new horizon for CO2-EOR and CO2 geological storage techniques: A review, Fuel, vol. 341, 2023, 127661, https://doi.org/10.1016/j.fuel.2023.127661.

* cited by examiner

REACTION OF METAL SALT WITH CARBON DIOXIDE FOR SUBTERRANEAN CARBON DIOXIDE MINERALIZATION

FIELD OF THE DISCLOSURE

The present disclosure relates generally to carbon dioxide sequestration and, more particularly, to mineralization and storage of carbon dioxide.

BACKGROUND OF THE DISCLOSURE

Reducing greenhouse gas emissions such as those of carbon dioxide are included in many energy transition plans. In particular, carbon capture, utilization, and storage (CCUS) is believed to be a promising technology area for reducing greenhouse gas emissions. As global populations continue to rise, use of fossil fuels will continue for purposes including heating and cooling, power generation, transport, and industry. CCUS offers emission reduction technology that may be applied across the energy system. CCUS technologies allow for the capture of carbon dioxide from fuel combustion or other industrial processes, transportation of the carbon dioxide, and use of the carbon dioxide either through a storage means (e.g., in subterranean geological formations) or as a resource to create products or services (e.g., for industrial uses).

Carbon dioxide mineralization is a form of CCUS whereby carbon dioxide is chemically converted to a mineral, often a carbonate compound. Mineralization of carbon dioxide allows for stable and long-term storage of the carbon dioxide without additional need for maintenance operations or costs.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A nonlimiting example method of the present disclosure may include: introducing, through a first wellbore to a subterranean formation, a first solution comprising a first aqueous fluid having dispersed therein a metal salt and a metal catalyst; introducing, through the first wellbore to the subterranean formation, a second solution comprising a second aqueous fluid, wherein the second aqueous fluid comprises brine, wherein the second solution has nanobubble carbon dioxide at least partially dispersed therein, and wherein the second solution is introduced after introduction of the first solution; injecting, through the first wellbore to the subterranean formation, carbon dioxide gas thereby at least partially dispersing the carbon dioxide gas in the first solution, wherein the dispersing includes at least partially dissolving the carbon dioxide gas in the first solution, thereby forming dissolved carbon dioxide; generating mineralized carbon dioxide from the dissolved carbon dioxide, wherein the generating comprises catalytically reacting the metal salt and the dissolved carbon dioxide using the metal catalyst, thereby forming the mineralized carbon dioxide; and depositing the mineralized carbon dioxide within the subterranean formation.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1A:
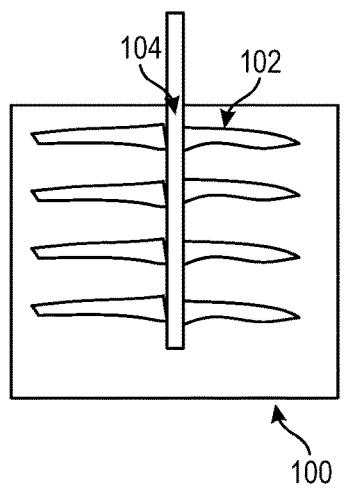
FIGS. 1A-1E are diagrams showing sequential progression of mineralization of carbon dioxide according to the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to carbon dioxide sequestration and, more particularly, to mineralization and storage of carbon dioxide.

The present disclosure provides methods and systems for carbon dioxide sequestration through mineralization and dissolution of carbon dioxide through use of aqueous solutions. The present disclosure may allow for increased mineralization of carbon dioxide up to 30% greater than conventional mineralization methods and systems due to added mineralization of carbon dioxide nanobubbles.

"Carbon dioxide," "carbon dioxide gas," and grammatical variations thereof as used herein may refer to carbon dioxide in gaseous, aqueous, or like forms, or any combination thereof.

The present disclosure may utilize two solutions followed by injection of carbon dioxide. A first solution may include a metal salt and a catalyst and a second solution may include carbon dioxide in a form of dissolved carbon dioxide and/or nanobubble carbon dioxide. Subsequently, carbon dioxide may be injected into the subterranean formation and may include nanobubble carbon dioxide. The inclusion of nanobubble carbon dioxide may allow for a greater quantity of carbon dioxide to be introduced to the subterranean formation and subsequently mineralized. The first solution, second solution, and the injected carbon dioxide may be combined, thus reacting the metal salt with carbon dioxide in the presence of a catalyst, forming mineralized carbon dioxide.

Figure 1B:
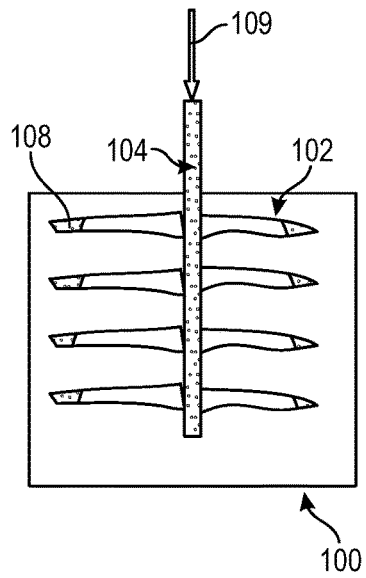
Figure 1C:
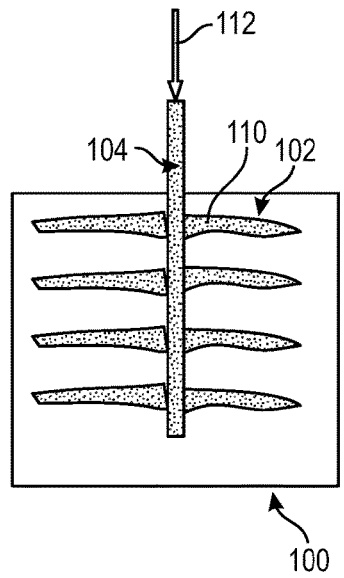
Figure 1D:
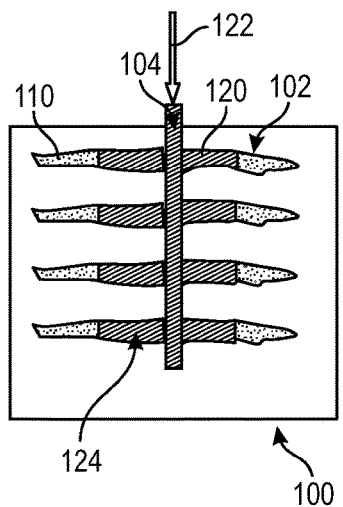
Figure 1E:
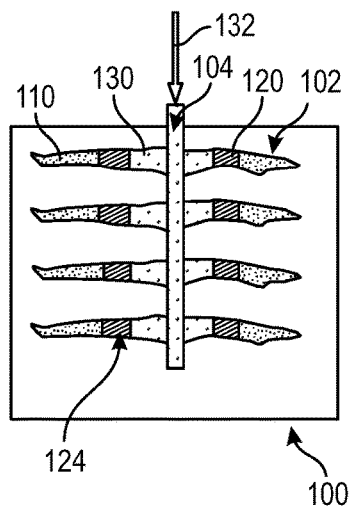

FIGS. 1A-1E are diagrams showing sequential progression of mineralization of carbon dioxide in a subterranean formation according to the disclosure herein. FIG. 1A illustrates subterranean formation 100 having fractures 102 and wellbore 104 therein. Fractures 102 may be naturally present and/or may be due to previously hydraulically fracturing subterranean formation 100. Subterranean formation 100 may be substantially depleted of hydrocarbons. It should be noted that although wellbore 104 is depicted in FIG. 1A as primarily vertical, wellbore 104 may be primarily horizontal, primarily vertical, or a combination thereof. In FIG. 1B, an optional brine flush solution 108 comprising a brine is introduced via wellbore 104 into fractures 102 of subterranean formation 100. The introduction of optional brine flush solution 108 is illustrated by arrow 109. In FIG. 1C, a first solution 110 comprising a metal salt and catalyst dispersed in an aqueous fluid is introduced via wellbore 104 into fractures 102 of subterranean formation 100. The introduction of first solution 110 is illustrated by arrow 112. In FIG. 1D, a second solution 120 comprising an aqueous fluid having optional nanobubble carbon dioxide dispersed therein is introduced via wellbore 104 into fractures 102 of subterranean formation 100. The introduction of second solution 120 is illustrated by arrow 122, and furthermore second solution 120 may form a fluid slug 124 within the fractures 102 of subterranean formation 100 between the wellbore 104 and the previously introduced first solution 110. Fluid slug 124 may serve as a spacer to mitigate mineralization of carbon dioxide in the near-wellbore region (proximity) of the wellbore, and/or may serve to drive the first solution 110 further into fractures 102 of the subterranean formation 104. In FIG. 1E, carbon dioxide gas 130 may be introduced via wellbore 104 into the fractures 102 of subterranean formation 100. The introduction of carbon dioxide 130 is illustrated by arrow 132. Carbon dioxide gas 130 may at least partially diffuse through fluid slug 124 comprising second solution 120 in order to reach first solution 110 and initiate mineralization, forming mineralized carbon dioxide from the carbon dioxide gas 130 and the metal salt in the presence of the catalyst.

The optional brine flush solution may comprise a brine (e.g., seawater, wastewater brine from desalination, produced water, formation water, the like, or any combination thereof). The brine used in the optional brine flush solution may have a total dissolved solids content (TDS) from 100 ppm to 250,000 ppm (or 100 ppm to 100,000 ppm, or 1,000 ppm to 250,000 ppm). The optional brine flush solution may serve to flush fractures and high permeability channels within the subterranean formation to prepare the subterranean formation for carbon dioxide mineralization. The optional brine flush solution may be added at a quantity of 25% less (or 1% to 25%, or 1% to 20%) pore volume of the subterranean formation. "Pore volume," and grammatical variations thereof, as used herein, refers to the total volume of pores within the subterranean formation.

The first solution may be formulated and subsequently introduced to the subterranean formation at any suitable temperature and pressure including ambient temperature and pressure or, for example, including, but not limited to, a temperature of −5° C. to 45° C. and a pressure of 0.1 atma (atmospheres, absolute) to 5 atma, or about 1 atma. The first solution may be introduced to the subterranean formation in a quantity of 40% less (or 1% to 40%, or 1% to 30%, or 1% to 25%, or 1% to 20%) pore volume of the subterranean formation.

The first solution may comprise a first aqueous fluid, a metal salt, and a catalyst. Optionally, the first solution may further comprise fly ash. The first aqueous fluid may comprise a brine (e.g., seawater, waste water brine from desalination, produced water, formation water, the like, or any combination thereof). The brine used in the first aqueous fluid may have a total dissolved solids content (TDS) from 100 parts per million (ppm) to 250,000 ppm (or 100 ppm to 100,000 ppm, or 1,000 ppm to 250,000 ppm), prior to the addition of catalyst, metal salt, and optional fly ash.

The metal salt may comprise any suitable metal salt including, but not limited to, for example, a metal hydroxide salt (e.g., calcium hydroxide ($Ca(OH)_2$), magnesium hydroxide ($Mg(OH)_2$), sodium hydroxide ($Na(OH)_2$), the like, or any combination thereof), a chloride salt (e.g., sodium chloride (NaCl), potassium chloride (KCl), magnesium chloride (MgCl), the like, or any combination thereof), the like, or any combination thereof. It should be noted that a portion of the metal salt may be supplied by the aqueous fluid (e.g., brine) used in the first solution and/or a portion of the metal salt may be added to the aqueous fluid to form the first solution. The metal salt may have a final concentration in the first solution of 0.5 wt % to 35 wt %, or 1 wt % to 30 wt %, or 1 wt % to 20 wt %, or 10 wt % to 30 wt %, or 30 wt % or less (by weight of the first solution). The metal salt may be at least partially dissolved in the first aqueous fluid.

The catalyst may comprise a metal catalyst (e.g., a nickel catalyst, a cobalt catalyst, a zinc catalyst, a molybdenum catalyst, a platinum catalyst, a palladium catalyst, a rhodium catalyst, an iron catalyst, the like, or any combination thereof). The catalyst may preferably comprise a nickel catalyst. The catalyst may be dispersed within the first solution. The catalyst may comprise particles of any suitable size. The catalyst may preferably comprise nanoparticles. "Nanoparticle," and grammatical variations thereof, as used herein, refers to a particle having average dimension(s) on the scale of 0.1 nanometers (nm) to 10,000 nm, preferably 0.1 nm to 1000 nm, and more preferably 0.1 nm to 100 nm. Catalyst concentration in the first solution may be 1 ppm to 10,000 ppm, preferably 10 ppm to 500 ppm, more preferably 10 ppm to 100 ppm.

The optional fly ash may be included in the first solution at any suitable concentration including a concentration of 0.1 wt % to 20 wt %, or 0.1 wt % to 15 wt %, or 1 wt % to 10 wt %. Any suitable type of fly ash may be used, including, but not limited to, fly ash originating from bituminous coal, subbituminous coal, lignite, the like, or any combination thereof.

The second solution may be formulated and subsequently introduced to the subterranean formation at any suitable temperature and pressure including, for example, a pressure of 1 psig to 10,000 psig (or 500 psig to 5,000 psig). The first solution may be introduced to the subterranean formation in a quantity of 5% less (or 0.1% to 5%, or 0.1% to 4%, or 0.1% to 3%, or 0.1% to 2%) pore volume of the subterranean formation.

The second solution may comprise the second aqueous fluid and carbon dioxide. The second aqueous fluid may comprise any suitable aqueous fluid including, but not limited to, for example, water, freshwater, seawater, waste water (e.g., brine from desalination, produced water, formation water, the like, or any combination thereof), the like, or any combination thereof. The second aqueous fluid may preferably comprise a brine.

The carbon dioxide within the second solution may comprise dissolved carbon dioxide and/or nanobubble carbon dioxide. The present disclosure may include dispersing precursor carbon dioxide gas in the second solution. Precursor carbon dioxide gas may comprise carbon dioxide. The present disclosure may further include introducing an electrical current to the second solution prior to and/or during introduction of the second solution into the subterranean formation and generating, using the electrical current, the nanobubble carbon dioxide from the precursor carbon dioxide gas.

The nanobubble carbon dioxide generation from the carbon dioxide may be promoted due to electrical stimulation of the second solution from the electrical current. Such stimulation may be performed in any sequence, including, for example, may be performed prior to introduction of the second solution into the subterranean formation, may be performed as the second solution is introduced into the subterranean formation, or a combination thereof. The electrical stimulation of the second solution may be performed by any suitable electrical current generator. In some embodiments, the electrical current generator may comprise an electrostriction apparatus (or "electrostrictor") based on electrostriction. "Electrostriction" as used herein refers to a property of electrical non-conductor materials, or dielectric materials, to undergo shape change upon application of an electric field. Electrostriction of an aqueous fluid may, without being bound by theory, displace ions by reducing water availability for interaction with such ions, thereby promoting the formation of nanobubble carbon dioxide.

The electrical current generator may operate at any suitable current and voltage, and may utilize direct current and/or alternating current. As a nonlimiting example, an electrical current generator may have a voltage of 0.01 volts (V) to 100 V, or 0.01 V to 10 V; and as a further nonlimiting example an electrical current generator may have a current of 0.1 amps (A) to 50 A, or 0.1 to 25 A. The electrical current generator may have an anode and a cathode. Said anode and said cathode may be of any suitable material capable of effectively conducting electricity so as to convey current through solutions in which the cathode and anode are immersed. Such material should be compatible with solutions of the present disclosure. Example cathode and anode materials may include, but are not to be limited to, for example, a metal (e.g., steel, titanium, the like, or any combination thereof), a carbon-fiber compound, the like, or any combination thereof. One of ordinary skill in the art will be able to implement appropriate apparatus for electrical stimulation with the benefit of the present disclosure.

"Nanobubble," and grammatical variations thereof, as used herein, refers to bubbles having average dimension(s) on the scale of 0.1 nm to 10,000 nm, preferably 0.1 nm to 1000 nm, and more preferably 0.1 nm to 100 nm. The nanobubble carbon dioxide may become dispersed within the second solution.

Carbon dioxide gas may be introduced to the subterranean formation (after the introduction of the first solution and the second solution) in any suitable fashion including injecting the carbon dioxide. The carbon dioxide gas may be introduced at any suitable pressure, preferably a pressure sufficient to diffuse carbon dioxide through the second solution and to the first solution, but not a pressure high enough to raise bottom hole pressure of the subterranean formation by more than 400% (or 200%, or 100%). The pressure of carbon dioxide gas introduction may have a range including, but not limited to, for example, 100 psi to 10,000 psi, or preferably 500 psi to 5000 psi, or more preferably 1000 psi to 5000 psi. The bottom hole pressure of a given formation may be a function of the depth of said subterranean formation. The carbon dioxide gas may be added to the subterranean formation at any suitable flow rate. The flow rate may be determined by features of the subterranean formation (e.g., geology, pore volume, well depth, the like, or any combination thereof). Carbon dioxide gas may be added into the subterranean formation in any quantity including a quantity greater than the stoichiometric quantity needed to completely react with the metal salt previously introduced to the subterranean formation. Such greater than stoichiometrically needed quantity may allow for ensuring sufficient reaction of the carbon dioxide gas and the metal salt to form mineralized carbon dioxide. It should be noted that the quantity of carbon dioxide introduced to the subterranean formation may preferably be from 5% to 25% (or 10% to 20%) pore volume of the subterranean formation.

The carbon dioxide gas introduced to the subterranean formation may include nanobubble carbon dioxide. The nanobubble carbon dioxide introduced to the subterranean formation may be generated on the surface by using electrostriction (as described above according to the present disclosure), or inside the wellbore of the subterranean formation using a suitable means (e.g., electrostriction), or any combination thereof.

The first solution and the second solution may be contacted within the subterranean formation in any suitable fashion. Subsequently, the introduced carbon dioxide gas (including nanobubble carbon dioxide) may be converted to mineralized carbon dioxide through catalytic interaction with metal salt. Without being bound by theory, nonlimiting example reactions are shown in Equations 1 and 2 below.

$$Ca(OH)_2 + CO_2 \xrightarrow{catalyst} CaCO_3 + H_2O \quad (1)$$

$$Mg(OH)_2 + CO_2 \xrightarrow{catalyst} MgCO_3 + H_2O \quad (2)$$

where calcium hydroxide and magnesium hydroxide each serve as metal salts, producing mineralized carbon dioxide in the form of calcium carbonate and magnesium carbonate, respectively, upon catalytic reaction with carbon dioxide (including nanobubble carbon dioxide).

The mineralizing of carbon dioxide may occur at any temperature including temperatures of the subterranean formation. Preferred temperatures for mineralizing carbon dioxide may include a temperature of 5° C. to 300° C., or 10° C. to 200° C., or preferably 25° C. to 100° C., or more preferably 25° C. to 75° C. Mineralizing of carbon dioxide may occur at any pressure including pressures of the subterranean formation. Preferred pressures for mineralizing carbon dioxide may include a pressure of 50 psig to 5000 psig, preferably 50 psig to 2000 psig, or more preferably 50 psig to 1300 psig. Such pressure may be maintained, for example, by the introduction of the carbon dioxide gas to the subterranean formation and apparatus therefor.

The reaction of carbon dioxide and the metal salt may be exothermic and thus provide energy generation. The present disclosure may optionally include a means of capturing energy generated by the reaction through an energy capture device placed in the subterranean formation. Examples of such energy capture devices may include, but are not limited to, a heat exchanger, a thermoelectric generator, the like, or any combination thereof.

It should be noted that the present disclosure may include methods of mineralizing carbon dioxide as described above, including wherein said methods employ systems previously described. Such methods may include providing a first solution, providing a second solution, dispersing carbon dioxide gas in the second solution. Such methods may further include introducing electrical stimulation in the form of an electrical current to the second solution and subsequently generating nanobubble carbon dioxide. Methods may further include combining at least a portion of the first solution and at least a portion of the second solution to form a combined solution, and generating mineralized carbon dioxide from the combined solution.

Other mechanisms may be utilized as part of the above-described methods to further promote mineralization of carbon dioxide. Such mechanisms may include downhole accelerators including, for example, infrasonic downhole accelerators, acoustic downhole accelerators, ultrasonic downhole accelerators, the like, or any combination thereof. Without being bound by theory, the acoustic or infrasonic or ultrasonic accelerators may impart energy to promote mineralization in the form of, for example, a pressure fluctuation, a cavitation, an acoustic stream, the like, or any combination thereof. Examples of other mechanisms for promoting mineralization may include, but are not limited to, advanced completion techniques.

In some embodiments, the fluids (e.g., the optional brine flush solution, the first solution, and the second solution) disclosed herein (including mixing of individual components or mixtures thereof) may be mixed at a remote location from a job site and shipped thereto or, in other embodiments, the fluids may mixed at a job site. In still other embodiments, the fluids may be mixed and pumped into a subterranean formation on-the-fly. A person having ordinary skill in the art of designing such fluids with the benefit of this disclosure will be able to consider these factors and determine whether remote mixing, on-site mixing, or any other suitable mixing protocol is most appropriate for a given operation. The systems used for handling fluids for use in operations of the present disclosure may include one or more mixing and/or storage tanks used for mixing and/or storing, respectively, fluids prior to use in a carbon dioxide mineralization operation. Additional tanks may be used for storing fluids removed from a subterranean formation as part of the operation. Following a carbon dioxide mineralization operation, the fluids or a spent or partially spent variant thereof may be produced from the subterranean formation during fluid flowback as outflow solution.

Systems for introduction of fluids (e.g., the optional brine flush solution, the first solution, the second solution, the carbon dioxide gas) to a wellbore in conjunction with a carbon dioxide mineralization operation may comprise a pump fluidly coupled to a tubing, the tubing located at least partially within the wellbore and the tubing containing a fluid for a desired operation. The "pump" described herein may comprise a single pump or may comprise one or more pumps in any combination. Given the benefit of the present disclosure, one having ordinary skill in the art will be able to select an appropriate pump or combination of pumps for a given operation.

The fluids of the present disclosure may be injected using the pump(s) into the subterranean formation using the wellbore tubing located within the wellbore. The fluid used in a particular operation may flow downhole through the wellbore tubing and flow out of the tubing into the subterranean formation in order to carry out the intended operation. Subsequently, in some operations, the fluid may be flowed back to the wellhead along with residual components as an outflow solution. The outflow solution may flow through the wellbore tubing or the wellbore annulus and back to the wellhead, or alternatively may flow through a secondary well having a secondary wellbore. The use of such outflow solution may be for any suitable purpose including, but not limited to, for example, to relieve pressure of the subterranean formation.

It should be noted that additional nonlimiting components may be present in systems suitable to introduce the fluids (e.g., the optional brine flush solution, the first solution, the second solution, the carbon dioxide gas) of the present disclosure to a subterranean formation and/or to recover fluid from the subterranean formation following an operation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

Additional Embodiments

Embodiment 1. A method comprising: introducing, through a first wellbore to a subterranean formation, a first solution comprising a first aqueous fluid having dispersed therein a metal salt and a metal catalyst; introducing, through the first wellbore to the subterranean formation, a second solution comprising a second aqueous fluid, wherein the second aqueous fluid comprises brine, wherein the second solution has nanobubble carbon dioxide at least partially dispersed therein, and wherein the second solution is introduced after introduction of the first solution; injecting, through the first wellbore to the subterranean formation, carbon dioxide gas thereby at least partially dispersing the carbon dioxide gas in the first solution, wherein the dispersing includes at least partially dissolving the carbon dioxide gas in the first solution, thereby forming dissolved carbon dioxide; generating mineralized carbon dioxide from the dissolved carbon dioxide, wherein the generating comprises catalytically reacting the metal salt and the dissolved carbon dioxide using the metal catalyst, thereby forming the mineralized carbon dioxide; and depositing the mineralized carbon dioxide within the subterranean formation.

Embodiment 2. The method of Embodiment 1, further comprising: dispersing precursor carbon dioxide gas in the second solution; introducing an electrical current to the second solution; and generating, using the electrical current, the nanobubble carbon dioxide from the precursor carbon dioxide gas.

Embodiment 3. The method of Embodiment 1 or 2, further comprising: introducing, through the first wellbore to the subterranean formation, a brine flush solution, prior to introducing the first solution, wherein the brine flush solution has total dissolved solids of 100 parts per million (ppm) to 250,000 ppm.

Embodiment 4. The method of Embodiment 3, wherein a quantity of the brine flush solution introduced to the subterranean formation is from 1% to 25% pore volume of the subterranean formation.

Embodiment 5. The method of any one of Embodiments 1-4, wherein a quantity of the first solution introduced to the subterranean formation is from 1% to 30% pore volume of the subterranean formation.

Embodiment 6. The method of any one of Embodiments 1-5, wherein a quantity of the second solution introduced to the subterranean formation is from 0.1% to 5% pore volume of the subterranean formation.

Embodiment 7. The method of any one of Embodiments 1-6, wherein the first wellbore comprises a primarily horizontal wellbore.

Embodiment 8. The method of any one of Embodiments 1-6, wherein the first wellbore comprises a primarily vertical wellbore.

Embodiment 9. The method of any one of Embodiments 1-8, wherein the subterranean formation comprises a previously fractured formation.

Embodiment 10. The method of any one of Embodiments 1-9, wherein the subterranean formation has been substantially depleted of hydrocarbons.

Embodiment 11. The method of any one of Embodiments 1-8, further comprising hydraulically fracturing the subterranean formation prior to introducing the first solution.

Embodiment 12. The method of any one of Embodiments 1-11, further comprising flowing an outflow solution from the subterranean formation through a second wellbore.

Embodiment 13. The method of Embodiment 12, wherein the flowing the outflow solution through the second wellbore reduces an internal pressure within the first wellbore.

Embodiment 14. The method of any one of Embodiments 1-13, further comprising promoting mineralization of the carbon dioxide gas using a downhole accelerator.

Embodiment 15. The method of any one of Embodiments 1-14, wherein the first aqueous fluid comprises brine, and wherein the brine has total dissolved solids of 100 parts per million (ppm) to 250,000 ppm.

Embodiment 16. The method of any one of Embodiments 1-15, wherein the metal salt is selected from the group consisting of calcium hydroxide, magnesium hydroxide, sodium chloride, sodium hydroxide, and any combination thereof.

Embodiment 17. The method of any one of Embodiments 1-16, wherein the first solution further comprises fly ash.

Embodiment 18. The method of any one of Embodiments 1-17, wherein the metal catalyst comprises nickel, wherein the nickel comprises nanoparticles, and wherein the nanoparticles have a size of 0.1 nanometers (nm) to 10,000 nm.

Embodiment 19. The method of any one of Embodiments 1-18, wherein the metal salt has a concentration in the first solution of 1 wt % to 30 wt %, by weight of the first solution.

Embodiment 20. The method of any one of Embodiments 1-19, wherein a quantity of the carbon dioxide gas introduced to the subterranean formation is in excess of a stoichiometric quantity needed to completely react with the metal salt to form the mineralized carbon dioxide.

Embodiment 21. The method of any one of Embodiments 1-20, wherein a quantity of the carbon dioxide gas introduced to the subterranean formation is from 5% to 25% pore volume of the subterranean formation.

Embodiment 22. The method of any one of Embodiments 1-21, wherein the mineralized carbon dioxide comprises a carbonate compound.

Embodiment 23. The method of Embodiment 22, wherein the carbonate compound comprises calcium carbonate, magnesium carbonate, sodium bicarbonate, or any combination thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:

introducing, through a first wellbore to a subterranean formation, a first solution comprising a first aqueous fluid having dispersed therein a metal salt and a metal catalyst;

introducing, through the first wellbore to the subterranean formation, a second solution comprising a second aqueous fluid, wherein the second aqueous fluid comprises brine, wherein the second solution has nanobubble carbon dioxide dispersed therein, and wherein the second solution is introduced after introduction of the first solution;

injecting, through the first wellbore to the subterranean formation, carbon dioxide gas thereby dispersing the carbon dioxide gas in the first solution, wherein the dispersing includes dissolving the carbon dioxide gas in the first solution, thereby forming dissolved carbon dioxide;

generating mineralized carbon dioxide from the dissolved carbon dioxide, wherein the generating comprises catalytically reacting the metal salt and the dissolved carbon dioxide using the metal catalyst, thereby forming the mineralized carbon dioxide; and depositing the mineralized carbon dioxide within the subterranean formation.

2. The method of claim 1, wherein introducing, through the first wellbore to the subterranean formation, a second solution, comprises:

dispersing precursor carbon dioxide gas in the second solution;

introducing, with an electrical current generator, an electrical current to the second solution comprising the precursor carbon dioxide gas; and generating, using the electrical current within the second solution, the nanobubble carbon dioxide from the precursor carbon dioxide gas;

introducing the second solution, comprising the nanobubble carbon dioxide, to the subterranean formation.

3. The method of claim 1, further comprising:
introducing, through the first wellbore to the subterranean formation, a brine flush solution, prior to introducing the first solution, wherein the brine flush solution has total dissolved solids of 100 parts per million (ppm) to 250,000 ppm.

4. The method of claim 3, wherein a quantity of the brine flush solution introduced to the subterranean formation is from 1% to 25% pore volume of the subterranean formation.

5. The method of claim 1, wherein a quantity of the first solution introduced to the subterranean formation is from 1% to 30% pore volume of the subterranean formation.

6. The method of claim 1, wherein a quantity of the second solution introduced to the subterranean formation is from 0.1% to 5% pore volume of the subterranean formation.

7. The method of claim 1, wherein the subterranean formation comprises a previously fractured formation.

8. The method of claim 1, further comprising hydraulically fracturing the subterranean formation prior to introducing the first solution.

9. The method of claim 1, further comprising flowing an outflow solution from the subterranean formation through a second wellbore.

10. The method of claim 9, wherein flowing the outflow solution through the second wellbore reduces an internal pressure within the first wellbore.

11. The method of claim 1, wherein the first aqueous fluid comprises brine, and wherein the brine has total dissolved solids of 100 parts per million (ppm) to 250,000 ppm.

12. The method of claim 1, wherein the metal salt is selected from the group consisting of calcium hydroxide, magnesium hydroxide, sodium chloride, sodium hydroxide, and any combination thereof.

13. The method of claim 1, wherein the first solution further comprises fly ash.

14. The method of claim 1, wherein the metal catalyst comprises nickel, wherein the nickel comprises nanoparticles, and wherein the nanoparticles have a size of 0.1 nanometers (nm) to 10,000 nm.

15. The method of claim 1, wherein the metal salt has a concentration in the first solution of 1 wt % to 30 wt %, by weight of the first solution.

16. The method of claim 1, wherein a quantity of the carbon dioxide gas introduced to the subterranean formation is in excess of a stoichiometric quantity needed to completely react with the metal salt to form the mineralized carbon dioxide.

17. The method of claim 1, wherein a quantity of the carbon dioxide gas introduced to the subterranean formation is from 5% to 25% pore volume of the subterranean formation.

18. The method of claim 1, wherein the mineralized carbon dioxide comprises a carbonate compound.

19. The method of claim 18, wherein the carbonate compound comprises calcium carbonate, magnesium carbonate, sodium bicarbonate, or any combination thereof.

* * * * *